United States Patent
Chen et al.

(10) Patent No.: US 12,254,260 B2
(45) Date of Patent: Mar. 18, 2025

(54) SYSTEMS AND METHODS FOR INTEGRATED CIRCUIT LAYOUT

(71) Applicant: Taiwan Semiconductor Manufacturing Company Limited, Hsinchu (TW)

(72) Inventors: Sheng-Hsiung Chen, Zhubei (TW); Chun-Chen Chen, Hsinchu (TW); Shao-huan Wang, Hsinchu (TW); Kuo-Nan Yang, Hsinchu (TW); Chung-Hsing Wang, Hsinchu (TW); Ren-Zheng Liao, Hsinchu (TW); Meng-Xiang Lee, Hsinchu (TW)

(73) Assignee: Taiwan Semiconductor Manufacturing Company Limited, Hsinchu (TW)

( * ) Notice: Subject to any disclaimer, the term of this patent is extended or adjusted under 35 U.S.C. 154(b) by 0 days.

(21) Appl. No.: 18/361,467

(22) Filed: Jul. 28, 2023

(65) Prior Publication Data

US 2024/0020451 A1    Jan. 18, 2024

Related U.S. Application Data

(63) Continuation of application No. 16/746,029, filed on Jan. 17, 2020, now Pat. No. 11,748,542.

(51) Int. Cl.
| | |
|---|---|
| G06F 30/392 | (2020.01) |
| G06F 30/327 | (2020.01) |
| G06F 30/3312 | (2020.01) |
| G06F 30/367 | (2020.01) |
| G06F 30/398 | (2020.01) |

(Continued)

(52) U.S. Cl.
CPC .......... *G06F 30/392* (2020.01); *G06F 30/327* (2020.01); *G06F 30/3312* (2020.01); *G06F 30/367* (2020.01); *G06F 30/398* (2020.01); *G06F 2111/04* (2020.01);
(Continued)

(58) Field of Classification Search
USPC ........................................ 257/296
See application file for complete search history.

(56) References Cited

U.S. PATENT DOCUMENTS 8,302,059 B2 * 10/2012 Pineda de Gyvez . G06F 30/392
716/135
9,652,579 B1 * 5/2017 Arkhipov ................ G06F 30/39
(Continued)

OTHER PUBLICATIONS

Final Office Action on U.S. Appl. No. 16/746,029 DTD Jan. 20, 2023.
(Continued)

*Primary Examiner* — Mohammed Alam
(74) *Attorney, Agent, or Firm* — FOLEY & LARDNER LLP

(57) ABSTRACT

An integrated circuit layout is provided. The integrated circuit layout includes one or more first cell rows partially extending across a space arranged for an integrated circuit layout along a first direction. Each of the one or more first cell rows has a first height along a second direction perpendicular to the first direction. The integrated circuit layout includes one or more third cell rows partially extending across the space along the first direction. Each of the one or more third cell rows has a second height along the second direction, the second height different from the first height.

20 Claims, 9 Drawing Sheets

(51) Int. Cl.
　　　*G06F 111/04*　　　(2020.01)
　　　*G06F 117/12*　　　(2020.01)
　　　*G06F 119/06*　　　(2020.01)
　　　*G06F 119/12*　　　(2020.01)

(52) U.S. Cl.
　　　CPC ...... *G06F 2117/12* (2020.01); *G06F 2119/06* (2020.01); *G06F 2119/12* (2020.01)

(56) References Cited

U.S. PATENT DOCUMENTS

| | | | |
|---|---|---|---|
| 2005/0166175 A1* | 7/2005 | Liebmann | G03F 1/30 716/55 |
| 2007/0202652 A1* | 8/2007 | Moroz | H01L 21/823807 438/296 |
| 2017/0317100 A1 | 11/2017 | Kang et al. | |
| 2019/0155984 A1 | 5/2019 | Chen et al. | |
| 2020/0134119 A1 | 4/2020 | Sio et al. | |
| 2020/0357786 A1 | 11/2020 | Sio et al. | |
| 2021/0224456 A1* | 7/2021 | Chen | G06F 30/398 |

OTHER PUBLICATIONS

Non-Final Office Action on U.S. Appl. No. 16/746,029 DTD Sep. 7, 2022.
Notice of Allowance on U.S. Appl. No. 16/746,029 DTD Apr. 24, 2023.

* cited by examiner

SYSTEMS AND METHODS FOR INTEGRATED CIRCUIT LAYOUT

CROSS-REFERENCE TO RELATED APPLICATION

This application is a continuation application of U.S. patent application Ser. No. 16/746,029, filed on Jan. 17, 2020, which is incorporated herein by reference in its entirety for all purposes.

BACKGROUND

Generally, electronic design automation (EDA) tools assist semiconductor designers to take a purely behavioral description of a desired circuit and work to fashion a finished layout of the circuit ready to be manufactured. This process usually takes the behavioral description of the circuit and turns it into a functional description, which is then decomposed into a number of Boolean functions and mapped into respective cell rows using a standard cell library. Once mapped, a synthesis is performed to turn the structural design into a physical layout, a clock tree is built to synchronize the structural elements, and the design is optimized post layout.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
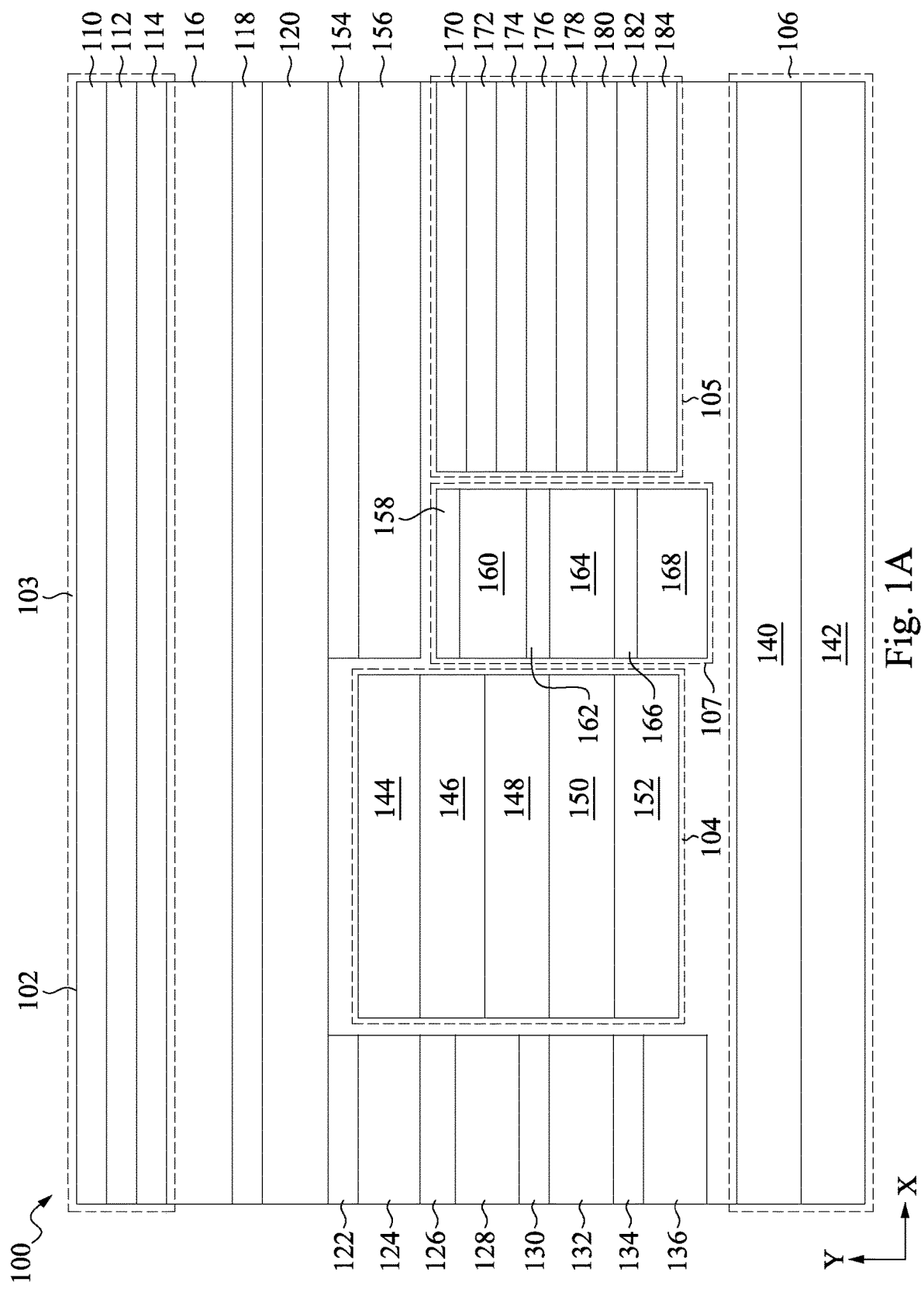
FIG. 1A illustrates a schematic diagram of an example integrated circuit layout, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In order to avoid misalignment across cells from respective different cell libraries, a cell from a standard cell library is typically used, which has a cell height equal to a height of the cell row (hereinafter "height"). As such, a decision is typically made at a relatively early design stage as to which single height to utilize for the design thereby fixing the corresponding height as well. By using only a single height, however, some compromises between circuit performance, circuit power, and the manufacturing process shall be made. For example, a performance-orientated circuit may be formed by disposing a plurality of cells side-by-side along a cell row, each of which has a higher number of active regions (e.g., fins); and a power/area-orientated circuit may be formed by disposing a plurality of cells side-by-side along a cell row, each of which has a lower number of active regions.

As such, to design a circuit that consumes low power and occupies a small area without sacrificing its performance (e.g., a balance-orientated circuit), various design compromises are typically made. For example, a first number of cells having a lower number of fins are alternately disposed between a second number of cells having a higher number of active regions. Such a layout causes a discontinuity on the extension of one or more of the active regions (typically known as "broken fins," or more generally, "broken active regions") in the second number of cells, which can disadvantageously lower the performance of the circuit (due to the relaxed strain/stress caused by the broken fins).

Concepts of using mixed heights have been proposed to alleviate such an issue. In essence, given a space arranged for a circuit design, the space can include a number of first cell rows having a first height and a number of second cell rows having a second, different height. The first cell rows can be used to place a first type of cells having a first height, and the second cell rows can be used to place a second type of cells having a second height. It is noted that, in the existing circuit design techniques that use mixed heights, each of the first cell rows and the second cell rows extends completely across the given space. In other words, while designing a circuit, the flexibility to design the circuit with different power/timing/performance requirements can only be provided through placing different numbers of first and second cell rows along a first direction (e.g., the Y direction) perpendicular to a second direction along which the first and second cell rows extend (e.g., the X direction). As such, some cells, for example, that share a similar timing requirement, which can advantageously optimize the design of the circuit when clustering close to each other, may be forced to scatter to different areas. The scattered cells may disadvantageously impact the speed of the circuit due to additional routings of interconnect structures, for example. Thus, the existing circuit design techniques may still not be entirely satisfactory.

The present disclosure provides various embodiments of systems and methods to design an integrated circuit using a plurality of first cell rows with a first height and a plurality of second cell rows with a second, different height. Further, each of the first cell rows and second cell rows can either partially or completely extend across a given space arranged for the design of an integrated circuit (e.g., the layout of the integrated circuit). The system, as disclosed herein, can identify a common power/timing/performance requirement to be shared by a plurality of cells, and arrange an area, consisting of either first row(s) or second row(s), in the given space to place the plurality of cells. Since the first and second rows are not required to extend completely across the given space, the area can be specially arranged for the plurality of cells with at least one additional flexibility. As such, the cells that share the common power/timing/performance requirement can be clustered in the area, which may advantageously solve the issue encountered by the existing circuit design techniques.

FIG. 1A illustrates a schematic diagram of an example integrated circuit (layout) 100 designed by systems and methods of the present disclosure, in accordance with some embodiments. Not all of the illustrated components are required, however, and some embodiments of the present disclosure may include additional components not shown in FIG. 1A. Variations in the arrangement and type of the components may be made without departing from the scope of the present disclosure as set forth herein. Additional, different or fewer components may be included.

Referring to FIG. 1A, the integrated circuit 100 includes a plurality of cell rows 110, 112, 114, 116, 118, 120, 122, 124, 126, 128, 130, 132, 134, 136, 140, 142, 144, 146, 148, 150, 152, 154, 156, 158, 160, 162, 164, 166, 168, 170, 172, 174, 176, 178, 180, 182, and 184 arranged (e.g., laid out) with respect to a space, grid, or floorplan 102 arranged for a design of the integrate circuit 100. In some embodiments, the cell rows 110-184 of the integrated circuit 100 may present at least two respective different row heights, or heights. As shown, the cell rows 110-114, 118, 122, 126, 130, 134, 158, 162, 166, and 170-184 may share a substantially similar row height, hereinafter "height A;" and the cell rows 116, 120, 124, 128, 132, 136, 140-152, 160, 164, and 168 may share a substantially similar a row height, hereinafter "height B," wherein the row height B is greater than the row height A. Such a row height corresponds to the cell height of a cell (sometimes referred to as a standard cell) to be placed therein, which shall be discussed below.

In some embodiments, some of the cell rows, which can have either the height A or height B, completely extend across the space 102 along a first direction (e.g., the X direction), while the other cell row, which can have either the height A or height B, partially extend across the space 102 along the first direction. For example, cell rows 110-114, and 118, with the height A, each completely extends across the space 102, while cell rows 122, 126, 130, 134, 154, 158, 162, 166, and 170-184, with the same height A, each partially extends across the space 102. Cell rows 116, 120, and 140-142, with the height B, each completely extends across the space 102, while cell rows 124, 128, 132, 136, 144-152, 156, 160, 164, and 168, with the same height B, each partially extends across the space 102.

Figure 1B:
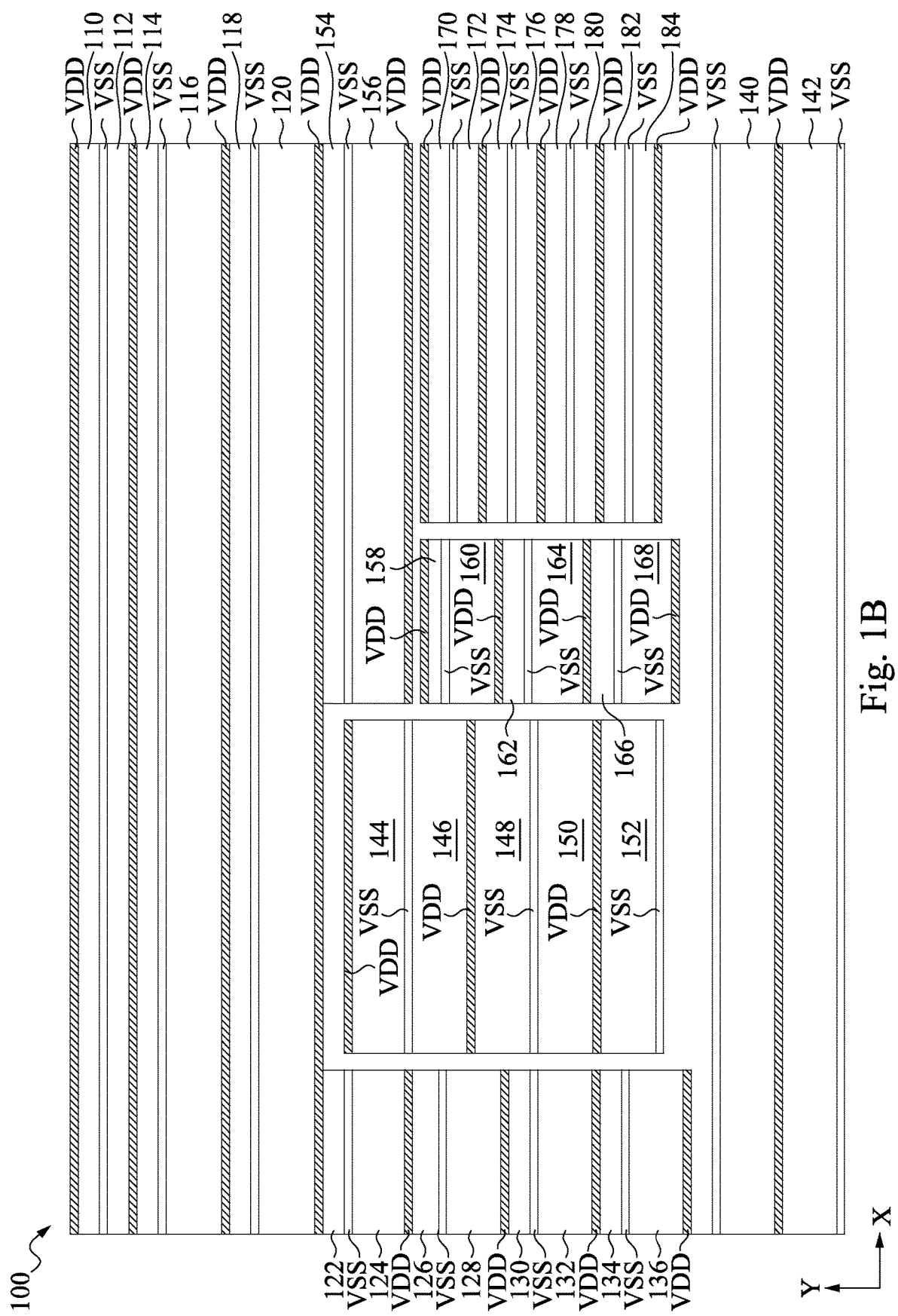
FIG. 1B illustrates a schematic diagram of a portion of the integrated circuit of FIG. 1A at a certain metallization level, in accordance with some embodiments.

Referring to FIG. 1B, a schematic diagram of a portion of the integrated circuit 100 at a certain metallization level (e.g., an M0 level) is shown, in accordance with some embodiments. As shown, each cell row, along a second direction perpendicular to the first direction (e.g., the Y direction), is bounded at respective sides with a first metal rail and a second metal rail. The first metal rail can be a VDD power rail configured to provide VDD to each of the cell placed within the cell row, and the second metal rail can be a VSS power rail configured to provide VSS to each of the cell placed within the cell row. The cell rows, adjacent to each other along the second direction, may combine, abut, or otherwise share the same VDD power rail or VSS power rail. For example in FIG. 1B, cell row 110 may share the same VSS power rail as cell row 112. As the VDD/VSS power rail may extend along the corresponding cell row, it is appreciated that some of the VDD/VSS power rails may completely extend across the space 102 along the X direction (e.g., the VSS power rail shared by cell rows 110 and 112), while the other VDD/VSS power rails may partially extend across the space 102 along the X direction (e.g., the VDD power rail shared by cell rows 164 and 166).

Figure 1C:
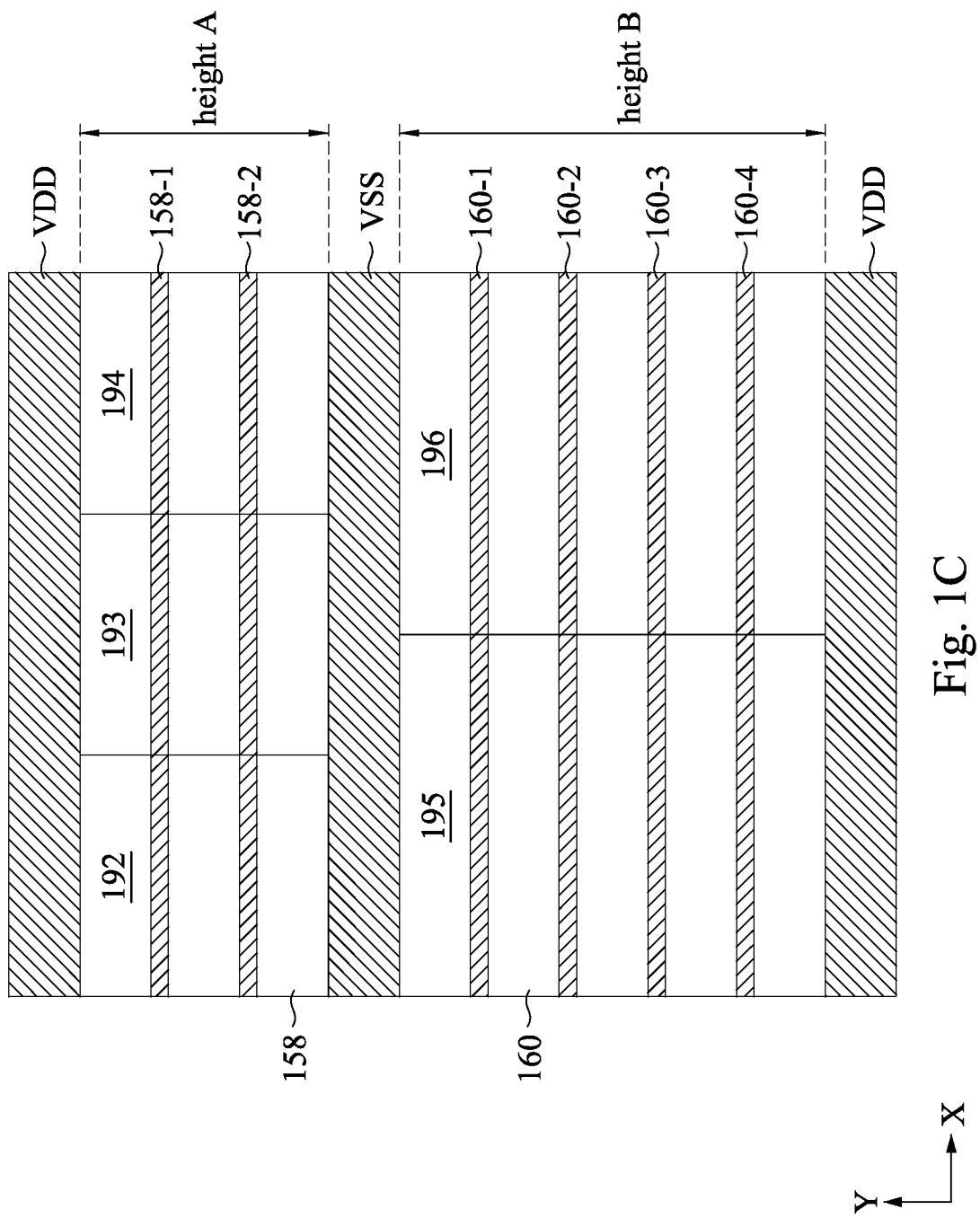
FIG. 1C illustrates a schematic diagram of a number of cells included in a portion of the integrated circuit of FIG. 1A, in accordance with some embodiments.

As mentioned above, each of the cell rows 110-184 is configured to place one or more cells with the same height. Referring now to FIG. 1C, a portion of the integrate circuit 100 (e.g., cell rows 158 and 160) is schematically shown. Cell row 158 can include cells 192, 193, and 194, each with the same height A, placed therein; and cell row 160 can include cells 195 and 196, each with the same height B, placed therein. Although, as shown in FIG. 1C, three cells (e.g., 192-194) are placed in cell row 158 and two cells (e.g., 195 and 196) are placed in cell row 160, it is appreciated that each of the cell rows, including cell rows 158 and 160, can include any number of cells with the same height disposed therein.

In some embodiments, the height of a cell row corresponds to the number of active regions of a cell that can be disposed or formed in the cell row. For example, the cell row with a taller height (e.g., height B) may allow more active regions to be formed therein than the cell row with a shorter height (e.g., height A). Such an active region, extending in parallel with the cell row, may be a fin-shaped region of one or more three-dimensional field-effect-transistors (e.g., Fin-FETs, gate-all-around (GAA) transistors), or an oxide-definition (OD) region of one or more planar metal-oxide-semiconductor field-effect-transistors (MOSFETs), wherein the active region may serve as a source feature or drain feature of the respective transistor(s). For example in FIG. 1A, the cells 192-194 disposed in cell row 158 may have two active regions 158-1 and 158-2; and the cells 195 and 196 disposed in cell row 160 may have four active regions 160-1, 160-2, 160-3, and 160-4.

In some embodiments, the system, as disclosed herein, can arrange, in the space 102, one or more contiguous areas, which can be sometimes referred to as a uniformly tall area (if all the cell rows constituting the area share a same tall height) or a uniformly short area (if all the cell rows constituting the area share a same short height). The system can arrange such a contiguous area based on an identified circuit module of the integrated circuit 100. For example, a circuit module may be identified as consisting of cells with the tall height based on determining that the circuit module was previously specified (e.g., user-specified) as a performance-oriented circuit module. In another example, a circuit module may be identified as consisting of cells with the short height based on determining that the circuit module was previously specified as a power-oriented circuit module. The circuit module, as discussed herein, may refer to a set of circuit components that is configured to perform a certain function. For example, the integrated circuit 100 can include a central processing unit (CPU), a graphic processing unit (GPU), an input/output (I/O) interface, and a memory. As such, a plurality of circuit modules, each of which can perform a certain function (e.g., calculation, reception of instruction, etc.), can collectively form the CPU. The system can arrange such a contiguous area based on at least one of an identified timing constraint, an identified performance constraint, or an identified power constraint that can be shared by the cells disposed in the contiguous area. It is appreciating that such cells does not necessarily correspond to a same circuit module. In some embodiments, such a shared timing/performance/power constraint may be specified by the design or identified by performing one or more simulations on the circuit design of the integrated circuit 100 using circuit simulators, e.g. Simulation Program with Integrated Circuit Emphasis (SPICE).

Referring again to FIG. 1A, the system, as disclosed herein, can arrange a contiguous area 103 consisting of (or expanded by) cell rows 110-114, each of which completely extends across the space 102; a contiguous area 104 consisting of (or expanded by) cell rows 144-152, each of which partially extends across the space 102; a contiguous area 105 consisting of (or expanded by) cell rows 170-184, each of which partially extends across the space 102; and a contiguous area 106 consisting of (or expanded by) cell rows 140-142, each of which completely extends across the space 102. Each of the contiguous areas 103-106 consists of one or more cell rows with a same height, which is sometimes referred to as a uniformly tall area or a uniformly short area. For example, the contiguous areas 103 and 105 may be each referred to as a uniformly short area, and the contiguous areas 104 and 106 may be each referred to as a uniformly tall area. The uniformly tall area may be configured to cluster, aggregate, or otherwise integrate cells that are performance-orientated (e.g., subject to a high performance), non-area-orientated (e.g., less subject to a large area), non-power-orientated (e.g., less subject to a high power consumption), and/or timing-critical (e.g., subject to a low latency); and the uniformly short area may be configured to cluster, aggregate, or otherwise integrate cells that are non-performance-orientated (e.g., less subject to a low performance), area-orientated (e.g., subject to a small area), power-orientated (e.g., subject to a low power consumption), and/or non-timing-critical (e.g., less subject to high latency).

Other than the uniformly short areas 103 and 105 and uniformly tall areas 104 and 106, the disclosed system can arrange one or more areas each consisting of cell rows with mixed heights or a single height. Such an area can be disposed between two uniformly short/tall areas that consist of partially extended cell rows. For example in FIG. 1A, the system can arrange an area 107 consisting of cell rows 158, 162, and 166 with the height A and cell rows 160, 164, and 168 with the height B. The area 107 may be disposed between the uniformly tall area 104 and the uniformly short area 105. Such an area 107 may be configured to cluster, aggregate, or otherwise integrate cells that are balance-orientated, e.g., keeping a balance between speed/performance, which is not too high or too low, and area/power performance, where the area is not too big or too small and the power consumption is not too high to too low.

Figure 2A:
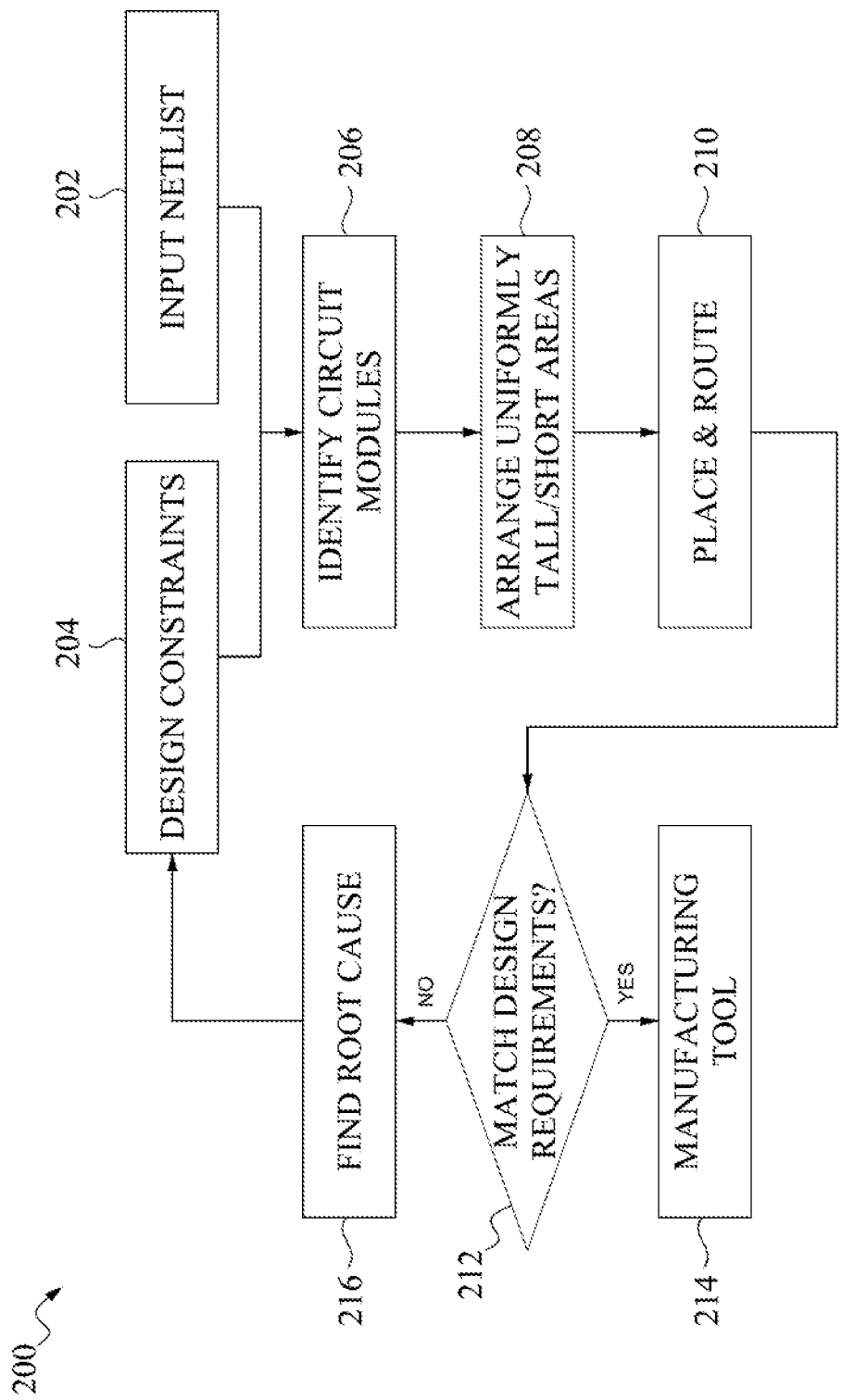
FIG. 2A illustrates a flow chart of an example method of generating an integrated circuit layout including one or more uniformly tall areas and/or one or more uniformly short areas, in accordance with some embodiments.

FIG. 2A illustrates a flow chart of an example method 200 of generating an integrated circuit layout including one or more uniformly tall areas and/or one or more uniformly short areas, in accordance with some embodiments of the present disclosure. In some embodiments, the method 200 may be collectively referred to as an EDA. The operations of the method 200 are performed by the respective components illustrated in FIG. 5. For purposes of discussion, the following embodiment of the method 200 will be described in conjunction with FIG. 5. The illustrated embodiment of the method 200 is merely an example. Therefore, it is understood that any of a variety of operations may be omitted, re-sequenced, and/or added while remaining within the scope of the present disclosure.

Figure 5:
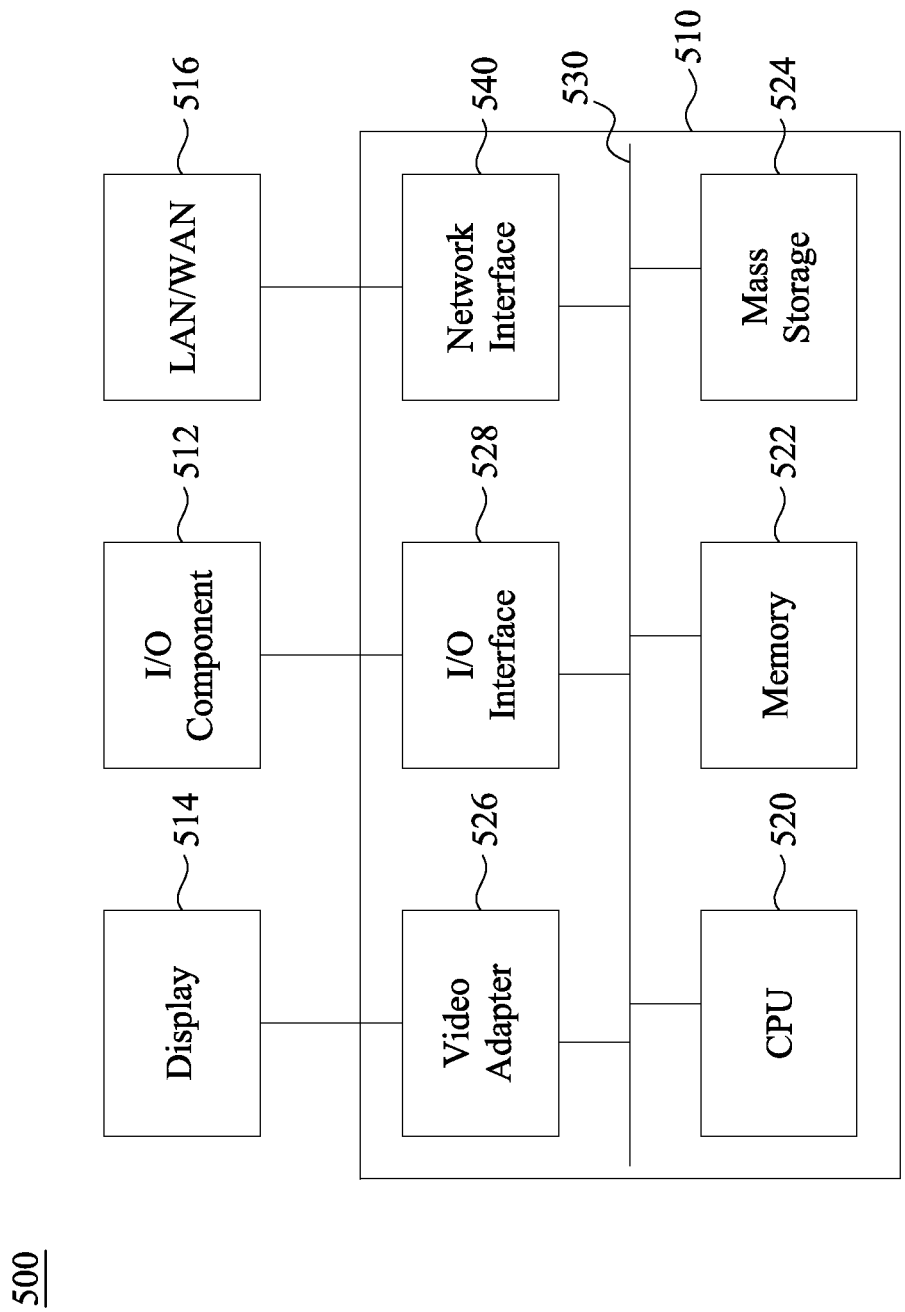
FIG. 5 illustrates a block diagram of an example information handling system (HIS), in accordance with some embodiments.

The method 200 starts with provision operations of "input netlist 202," and "design constraints 204," in accordance with some embodiments. The input netlist 202 may be a functionally equivalent logic gate-level circuit description provided through a synthesis process. The synthesis process forms the functionally equivalent logic gate-level circuit description by matching one or more behavior and/or functions to (standard) cells from a set of cell libraries. The behavior and/or functions are specified based upon various signals or stimuli applied to the inputs of an overall design of the integrated circuit (e.g., the integrated circuit 100), and may be written in a suitable language, such as a hardware description language (HDL). The input netlist 202 may be uploaded into the processing unit 510 through the I/O interface 528 (FIG. 5), such as by a user creating the file while the EDA is executing. Alternately, the input netlist 202 may be uploaded and/or saved on the memory 522 or mass storage device 524, or the input netlist 202 may be uploaded through the network interface 540 from a remote user (FIG. 5). In these instances, the CPU 520 shall access or interface with the input netlist 202 during execution of the EDA.

The user also provides the design constraints 204 in order to constrain the overall design of a physical layout of the input netlist 202. In some embodiments, the design constraints 204 may be input, for example, through the I/O interface 528, downloading through the network interface 540, or the like. The design constraints 204 may specify timing, process parameters, and other suitable constraints with which the input netlist 202, once physically formed into an integrated circuit, must comply.

The method 200 proceeds to operation 206 to "identify circuit modules," in accordance with some embodiments. Based on the input netlist 202 and/or the design constraints 204, the disclosed system can recognize, identify, or otherwise determine one or more circuit modules that are specified by the user, for example, to be constituted by the cells with a tall height (hereinafter "tall cells"), the cells with a short height (hereinafter "short cells"), or the cells with mixed heights.

For example, the system may identify a first circuit module in response to the input netlist 202 specifying that the first circuit module is a performance-orientated circuit module, which shall consist of the tall cells (e.g., only the cells with the height B). In another example, the system may identify a second circuit module in response to the input netlist 202 specifying that the second circuit module is a power-orientated circuit module, which shall consist of the short cells (e.g., only the cells with the height A). Alternately or additionally, the system can identify a circuit module, which shall consist of tall or short cells, by determining at least one of a timing constraint, a performance constraint, or a power constraint corresponding to the circuit module. The system can access, communicate with, or otherwise interface with the design constraints 204 to determine such timing/performance/power constraint(s). In some embodiments, the system can identify, based on the input netlist 202, one or more circuit modules that shall not consist of only the tall or short cells. Continuing with the above example, the system may identify a third circuit module in response to the input netlist 202 specifying that the third circuit module is a balance-orientated circuit module, which shall not consist of only the tall cells or the short cells.

The method 200 proceeds to operation 208 to "arrange uniformly tall/short areas," in accordance with some embodiments. In response to identifying one or more circuit modules that shall consist of either the tall cells or short cells (e.g., in the operation 206), the system can arrange corresponding uniformly tall or short areas. In some embodiments, the uniformly tall area can consist of one or more cell rows with the tall height (e.g., the height B) that partially extend across the space 102 (e.g., 144-152. etc.), or one or more cell rows with the tall height that completely extend across the space 102 (e.g., 140-142. etc.); the uniformly short area can consist of one or more cell rows with the short height (e.g., the height A) that partially extend across the space 102 (e.g., 170-184. etc.), or one or more cell rows with the short height that completely extend across the space 102 (e.g., 110-114. etc.). In some other embodiments, the system can arrange a uniformly tall area consisting of a first group of cell rows with the tall height that partially extend across the space 102 and a second group of cell rows with the tall height that completely extend across the space 102. Continuing with the above example where the first circuit module is identified as consisting of the tall cells, the system can arrange a uniformly tall area (e.g., 104, 106, etc.) in the space 102 for placing the tall cells. In the example where the second circuit module is identified as consisting of the short cells, the system can arrange a uniformly short area (e.g., 103, 105, etc.) in the space 102 for placing the short cells. For the circuit module that has been identified as being constituted by a mix of the tall cells and the short cells (e.g., the third circuit module mentioned above), the system can arrange an area (e.g., 107) in the space 102 for placing the tall cells and short cells.

The method 200 proceeds to operation 210 to "place and route," in accordance with some embodiments. In response to arranging the uniformly tall and/or short areas for respective circuit modules, the system can place and route cells to generate an actual physical design for the overall integrated circuit. The operation 210 is configured to form the physical design by taking the chosen cells from cell libraries and placing them into respective cell rows. Continuing with the same example, the system can extract, retrieve, or obtain, based on the identified first circuit module, one or more tall cells from a cell library to be placed in the cell rows of the uniformly tall areas 104 and 106; and obtain, based on the identified second circuit module, one or more short cells from the same or a different cell library to be placed in the cell rows of the uniformly short areas 103 and 105. The placement of each cell within the cell rows, and the placement of each cell row in relation to other cell rows, may be guided by cost functions in order to minimize wiring lengths and area requirements of the resulting integrated circuit. This placement may be done either automatically through the operation 210, or else may alternately be performed partly through a manual process, whereby the user may manually insert one or more cells into a cell row.

The method 200 then proceeds to operation 212 to determine whether the actual physical design for the overall integrated circuit "match design requirements," in accordance with some embodiments. In response to generating the actual physical design for the overall integrated circuit (in the operation 210), the system can check, monitor, or otherwise determine whether the design requirements are matched. Various requirements may be checked such as, for example, a timing quality of the actual physical design for the overall integrated circuit, a power quality of the actual physical design for the overall integrated circuit, whether a local congestion issue exists, etc., by performing one or more simulations using circuit simulators, e.g., Simulation Program with Integrated Circuit Emphasis (SPICE).

If all the design requirements are met, the method 200 continues to operation 214 of "manufacturing tool." On the other hand, if not all of the design requirements are met, the method 200 continues to operation 216 of "find root causes."

The system can perform the operation 216 to find the causes resulting in the failure of meeting the design requirements in the determination operation 212. Various causes may result in the failure. Based on which of the causes is or are, the method 200 may proceed to a respective operation to re-perform that operation. For example, when the cause is due to an incorrect arrangement of cell row(s), the method 200 may proceed to an operation (e.g., the operation 204) to re-assess the constraints specified therein. When the cause is due to an infeasibility of synthesizing the functionally equivalent logic gate-level circuit description, the method 200 may proceed to an operation (e.g., the operation 204) to re-assess the constraints specified therein. When cause is due to an infeasibility of generating the actual physical design, the method 200 may proceed to an operation (e.g., the operation 210) to re-place and/or re-route.

The system can perform the manufacturing tool 214 to generate, e.g., photolithographic masks, that may be used in physically manufacturing the physical design. The physical design may be sent to the manufacturing tool 214 through the LAN/WAN 516.

Figure 2B:
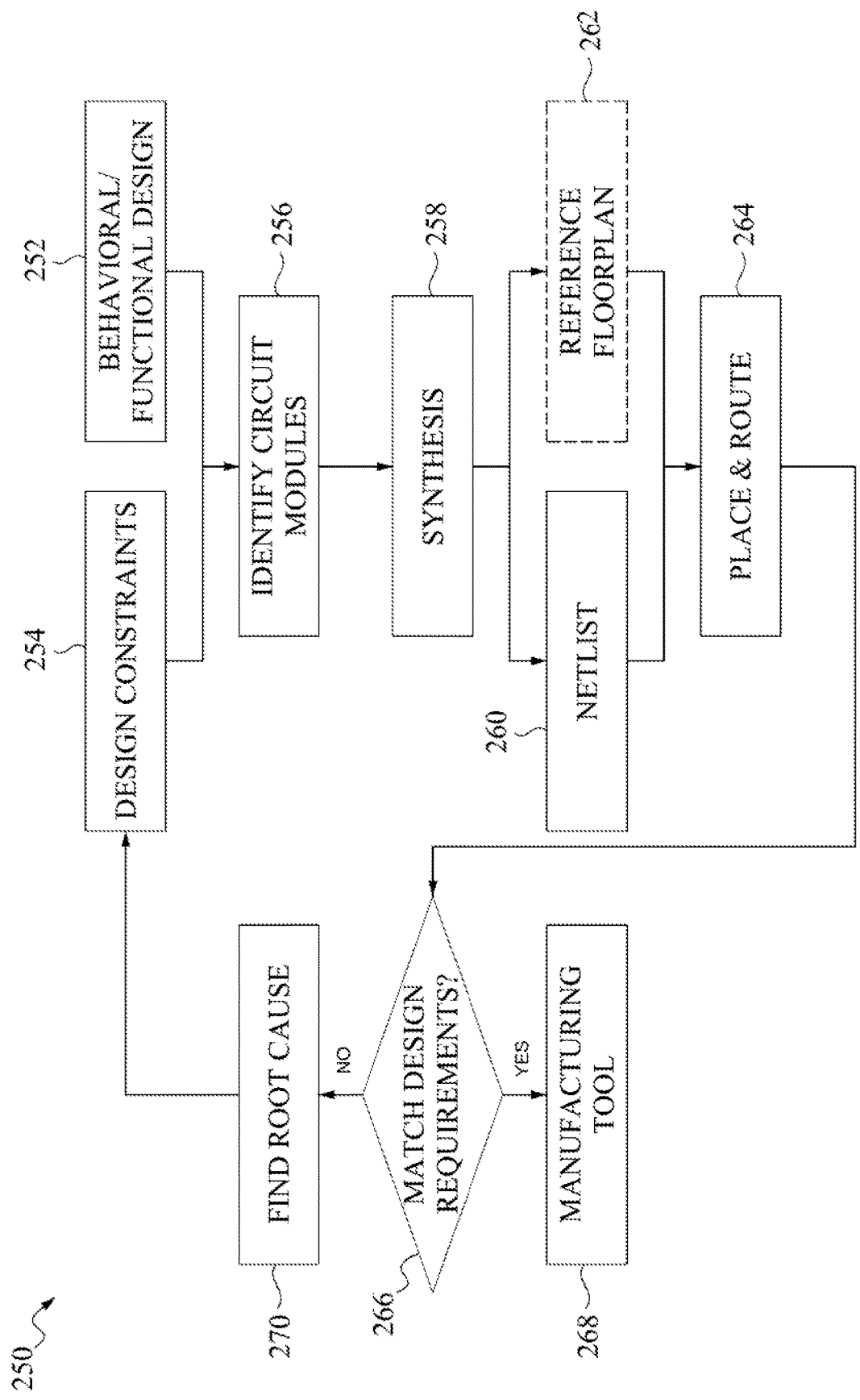
FIG. 2B illustrates a flow chart of another example method of generating an integrated circuit layout including one or more uniformly tall areas and/or one or more uniformly short areas, in accordance with some embodiments.

FIG. 2B illustrates a flow chart of an example method 250 of generating an integrated circuit layout including one or more uniformly tall areas and/or one or more uniformly short areas, in accordance with some embodiments of the present disclosure. In some embodiments, the method 250 may be collectively referred to as an EDA. The operations of the method 250 are performed by the respective components illustrated in FIG. 5. For purposes of discussion, the following embodiment of the method 250 will be described in conjunction with FIG. 5. The illustrated embodiment of the method 250 is merely an example. Therefore, it is understood that any of a variety of operations may be omitted, re-sequenced, and/or added while remaining within the scope of the present disclosure.

The method 250 starts with provision operations of "behavioral/functional design 252" and "design constraints 254," in accordance with some embodiments. The behavioral/functional design 252 specifies the desired behavior or function of an integrated circuit (e.g., the integrated circuit 100) based upon various signals or stimuli applied to the inputs of an overall design of the integrated circuit, and may be written in a suitable language, such as a hardware description language (HDL). The behavioral/functional design 252 may be uploaded into the processing unit 510 through the I/O interface 528 (FIG. 5), such as by a user creating the file while the EDA is executing. Alternately, the behavioral/functional design 252 may be uploaded and/or saved on the memory 522 or mass storage device 524, or the behavioral/functional design 252 may be uploaded through the network interface 540 from a remote user (FIG. 5). In these instances, the CPU 520 will access the behavioral/functional design 252 during execution of the EDA. The operation of design constraints 254 is substantially similar to the operation 204, and thus the discussion shall not be repeated here.

The method 250 proceeds to operation 256 to "identify circuit modules," in accordance with some embodiments. Based on the behavioral/functional design 252 and/or the design constraints 254, the disclosed system can recognize, identify, or otherwise determine one or more circuit modules that is specified or predefined by the user, for example, to consist of either the tall cells or the short cells. For example, the system may identify a first circuit module in response to the behavioral/functional design 252 specifying that the first circuit module is a performance-orientated circuit module, which shall consist of the tall cells (e.g., the cells with the height B). In another example, the system may identify a second circuit module in response to the behavioral/functional design 252 specifying that the second circuit module is a power-orientated circuit module, which shall consist of the short cells (e.g., the cells with the height A). Alternately or additionally, the system can identify a circuit module, which shall consist of tall or short cells, by determining at least one of a common timing constraint, a common performance constraint, or a common power constraint corresponding to the circuit module. The system can access, communicate with, or otherwise interface with the design constraints 254 to determine such timing/performance/power constraint(s). In some embodiments, the system can identify, based on the behavioral/functional design 252, one or more circuit modules that shall not consist of only one type of the tall or short cells. Continuing with the above example, the system may identify a third circuit module in response to the behavioral/functional design 252 specifying that the third circuit module is a balance-orientated circuit module, which shall not consist of only the tall cells or the short cells.

The method 250 then proceeds to operation 258 of "synthesis," in accordance with some embodiments. In response to identifying the circuit modules (the operation 256), the system can match the behavior and/or functions desired from the behavioral/functional design 252 to (standard) cells from one or more cell libraries, while simultaneously meeting the constraints specified by the design constraints 254 and the cell heights specified by the identified circuit modules (the operation 256) to create a functionally equivalent logic gate-level circuit description, such as a netlist (operation 260). In the operation 258, the system can form the netlist by arranging a uniformly tall or short area for each of the circuit modules that have been identified as consisting of either the tall cells or the short cells. Concurrently with arranging the uniformly tall/short areas, the system can arrange one or more areas for each of the circuit modules that have been identified as being constituted by a mix of the tall cells and the short cells. The operation 258 may sometimes be referred to as a "physically aware" synthesis.

In some embodiments, concurrently with generating the netlist, the system can optionally generate a reference floorplan (operation 262). The reference floorplan may include a number of areas that each has been arranged as a uniformly tall area, a uniformly short area, or an area with mixed heights. Each of the areas may include corresponding cells placed therein. Such a reference floorplan may function as an initial value or guess for the subsequent operation (e.g., operation 264), which may advantageously reduce calculation (e.g., converge) time.

The remaining operations of the method 250 are substantially similar as the operations discussed with respect to FIG. 2A. For example, operations 264, 266, 268, and 270 are substantially similar to the operations 210, 212, 214, and 216, respectively. Thus, the discussions of such operations shall not repeated here.

Figure 3A:
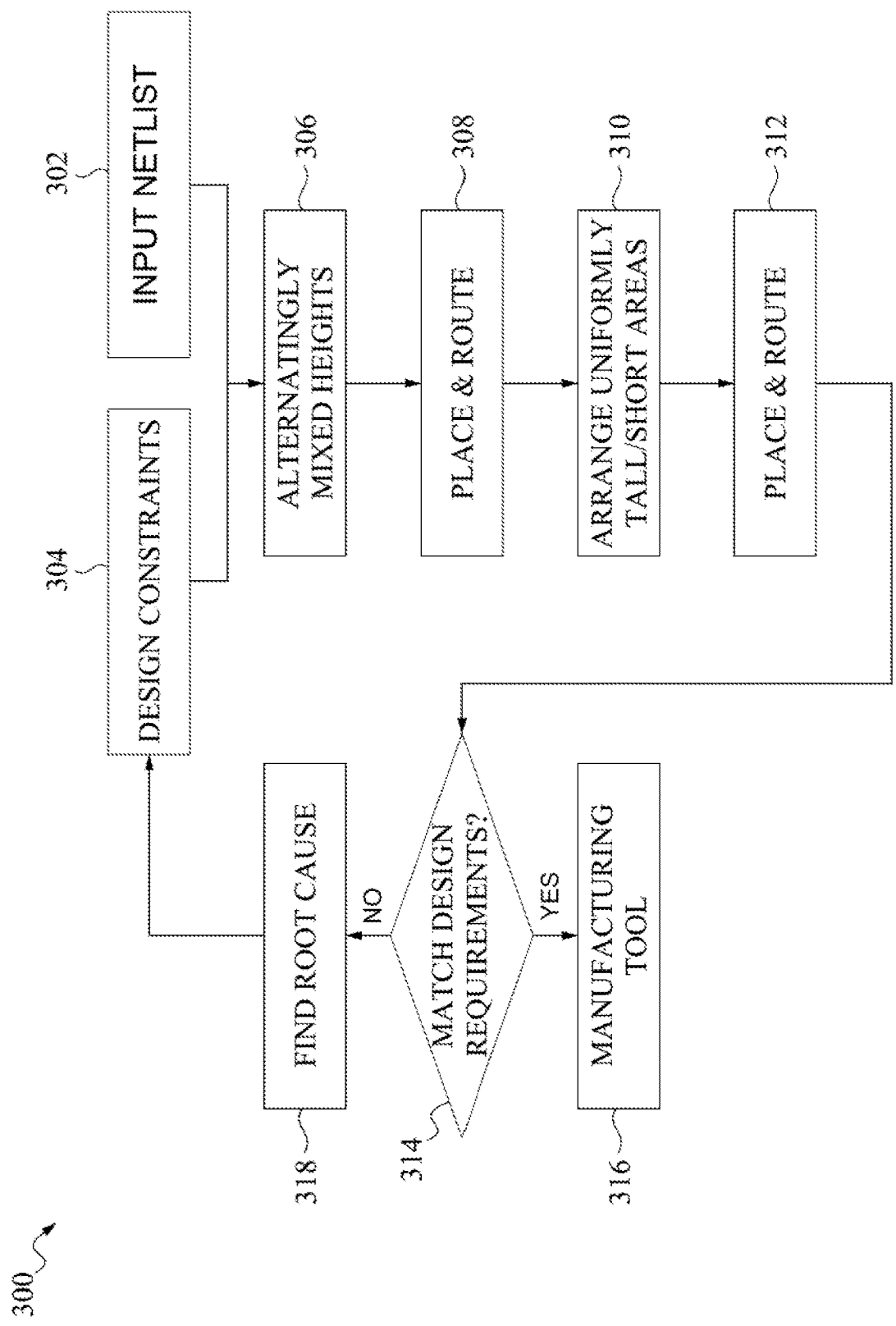
FIG. 3A illustrates a flow chart of yet another example method of generating an integrated circuit layout including one or more uniformly tall areas and/or one or more uniformly short areas, in accordance with some embodiments.

FIG. 3A illustrates a flow chart of an example method 300 of generating an integrated circuit layout including one or more uniformly tall areas and/or one or more uniformly short areas, in accordance with some embodiments of the present disclosure. In some embodiments, the method 300 may be collectively referred to as an EDA. The operations of the method 300 are performed by the respective components illustrated in FIG. 5. For purposes of discussion, the following embodiment of the method 300 will be described in conjunction with FIG. 5. The illustrated embodiment of the method 300 is merely an example. Therefore, it is understood that any of a variety of operations may be omitted, re-sequenced, and/or added while remaining within the scope of the present disclosure.

The method 300 starts with provision operations of "input netlist 302," and "design constraints 304," in accordance with some embodiments. The input netlist 302 may be a functionally equivalent logic gate-level circuit description provided through a synthesis process. The synthesis process forms the functionally equivalent logic gate-level circuit description by matching one or more behavior and/or functions to (standard) cells from a set of cell libraries. The behavior and/or functions are specified based upon various signals or stimuli applied to the inputs of an overall design of the integrated circuit (e.g., the integrated circuit 100), and may be written in a suitable language, such as a hardware description language (HDL). The input netlist 302 may be uploaded into the processing unit 510 through the I/O interface 528 (FIG. 5), such as by a user creating the file while the EDA is executing. Alternately, the input netlist 302 may be uploaded and/or saved on the memory 522 or mass storage device 524, or the input netlist 302 may be uploaded through the network interface 540 from a remote user (FIG. 5). In these instances, the CPU 520 shall access or interface with the input netlist 302 during execution of the EDA.

The user also provides the design constraints 304 in order to constrain the overall design of a physical layout of the input netlist 302. In some embodiments, the design constraints 304 may be input, for example, through the I/O interface 528, downloading through the network interface 540, or the like. The design constraints 304 may specify timing, process parameters, and other suitable constraints with which the input netlist 302, once physically formed into an integrated circuit, must comply.

The method 300 proceeds to operation 306 of "alternately mixed heights," in accordance with some embodiments. In operation 306, the system can obtain, retrieve, or otherwise interface with a space consisting of a number of first cell rows that have a tall height (e.g., the height B) and a number of second cell rows that have a short height (e.g., the height A). Each of the first cell rows and the second cell rows completely extends across the space. Such a space may be sometimes referred to as a floorplan with alternately mixed heights.

The method 300 then proceeds to operation 308 to "place and route," in accordance with some embodiments. In response to obtaining the floorplan with alternately mixed heights, the system can perform the operation 308 to generate an actual physical design for the overall integrated circuit. The operation 308 is configured to form the physical design by taking the chosen cells from cell libraries and placing them into respective cell rows of the floorplan with alternately heights. For example, the system can extract, retrieve, or obtain, based on the netlist (the operation 302), one or more tall cells from a cell library to be placed in the cell rows with the tall height; and obtain, based on the netlist, one or more short cells from the same or a different cell library to be placed in the cell rows with the short height. The placement of each cell within the cell rows, and the placement of each cell row in relation to other cell rows, may be guided by cost functions in order to minimize wiring lengths and area requirements of the resulting integrated circuit. This placement may be done either automatically through the operation 308, or else may alternately be performed partly through a manual process, whereby the user may manually insert one or more cells into a cell row.

In response to generating the actual physical design for the overall integrated circuit on the floorplan of alternately heights (in the operation 308), the system can check, monitor, or otherwise determine whether the design requirements are matched. Various requirements may be checked such as, for example, a timing quality of the actual physical design for the overall integrated circuit, a power quality of the actual physical design for the overall integrated circuit, whether a local congestion issue exists, etc., by performing one or more simulations using circuit simulators, e.g., Simulation Program with Integrated Circuit Emphasis (SPICE).

The method 300 continues to operation 310 to "arrange uniformly tall/short areas," in accordance with some embodiments. The system can identify, from the simulations, one or more areas on the space that include a number of conflicts with a predetermined performance requirement. The conflict may correspond to a violation against at least one of the timing quality requirement, the power quality requirement, etc. The system can recognize, identify, or otherwise determine one or more areas on the space with a number of conflicts satisfying (e.g., exceeding) a predefined threshold. Upon identifying such areas, the system can replace or otherwise update the space (which was expanded by alternately mixed heights) to be expanded by cell rows with different heights but the cell rows are not required to completely extend across the space. In other words, the new cell rows, at least partially constituting the space, can include one or more cell rows with a tall height (e.g., the height B) that partially extend across the space, one or more cell rows with the tall height that completely extend across the space, one or more cell rows with a short height (e.g., the height A) that partially extend across the space, and one or more cell rows with the short height that completely extend across the space. Based on the identified areas that have an exceeding number of violations, the system can arrange one or more uniformly tall or short areas around the same locations of the identified areas. For example, after the simulations, in response to identifying an area on the space that includes a certain number of timing violations, the system can arrange a uniformly tall area (e.g., 104, 106 of FIG. 1A) where only the tall cells can be disposed therein. In this way, the timing violation may be resolved as the cells placed in the uniformly tall area generally have better performance.

In some embodiments, the uniformly tall/short area (or the cells to be placed in this area) shares at least one of a common timing constraint, a common performance constraint, or a common power constraint. For example, the uniformly tall area may be configured to cluster, aggregate, or otherwise integrate cells that are performance-orientated (e.g., subject to a high performance), non-area-orientated (e.g., less subject to a large area), non-power-orientated (e.g., less subject to a high power consumption), and/or timing-critical (e.g., subject to a low latency); and the uniformly short area may be configured to cluster, aggregate, or otherwise integrate cells that are non-performance-orientated (e.g., less subject to a low performance), area-orientated (e.g., subject to a small area), power-orientated (e.g., subject to a low power consumption), and/or non-timing-critical (e.g., less subject to high latency).

The method 300 proceeds to operation 312 to "place and route," in accordance with some embodiments. In response to arranging the uniformly tall and/or short areas, the system can perform the operation 312 to again generate an actual physical design for the overall integrated circuit. The operation 312 is configured to form the physical design by taking the chosen cells from cell libraries and placing them into respective cell rows of the uniformly short/tall areas. The placement of each cell within the cell rows, and the placement of each cell row in relation to other cell rows, may be guided by cost functions in order to minimize wiring lengths and area requirements of the resulting integrated circuit. This placement may be done either automatically through the operation 312, or else may alternately be performed partly through a manual process, whereby the user may manually insert one or more cells into a cell row.

The method 300 then proceeds to operation 314 to determine whether the actual physical design for the overall integrated circuit "match design requirements," in accordance with some embodiments. In response to generating the actual physical design for the overall integrated circuit (in the operation 312), the system can again check, monitor, or otherwise determine whether the design requirements are matched. Various requirements may be checked such as, for example, a timing quality of the actual physical design for the overall integrated circuit, a power quality of the actual physical design for the overall integrated circuit, whether a local congestion issue exists, etc., by performing one or more simulations using circuit simulators, e.g., Simulation Program with Integrated Circuit Emphasis (SPICE).

If all the design requirements are met, the method 300 continues to operation 316 of "manufacturing tool." On the other hand, if not all of the design requirements are met, the method 300 continues to operation 318 to "find root causes."

The system can perform the operation 318 to find the causes resulting in the failure of meeting the design requirements in the determination operation 314. Various causes may result in the failure. Based on which of the causes is or are, the method 300 may proceed to a respective operation to re-perform that operation. For example, when the cause is due to an incorrect arrangement of cell row(s), the method 300 may proceed to an operation (e.g., the operation 304) to re-assess the constraints specified therein. When the cause is due to an infeasibility of synthesizing the functionally equivalent logic gate-level circuit description, the method 300 may proceed to an operation (e.g., the operation 304) to re-assess the constraints specified therein. When cause is due to an infeasibility of generating the actual physical design, the method 300 may proceed to an operation (e.g., the operation 312) to re-place and/or re-route.

The system can perform the manufacturing tool 316 to generate, e.g., photolithographic masks, that may be used in physically manufacturing the physical design. The physical design may be sent to the manufacturing tool 316 through the LAN/WAN 516.

Figure 3B:
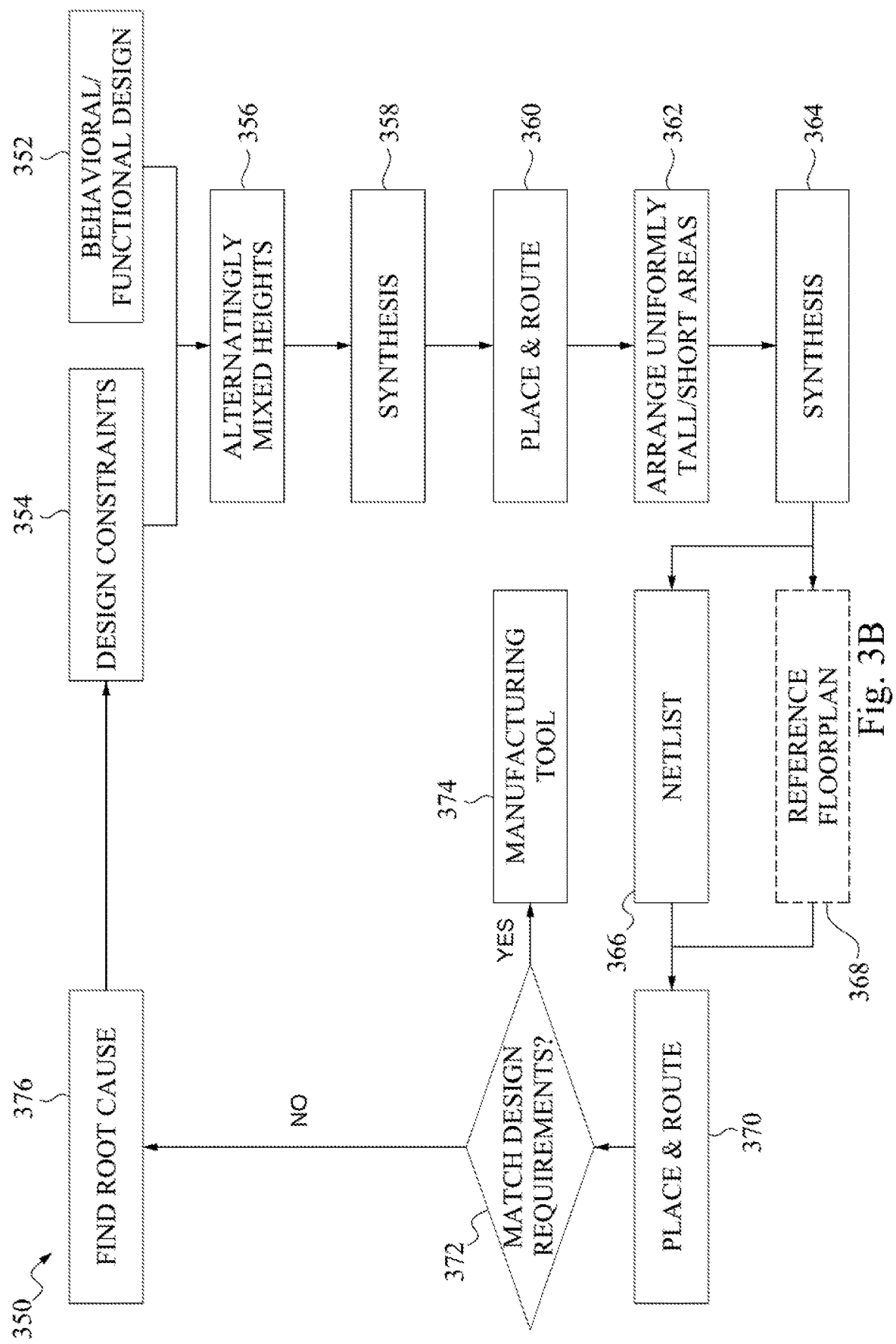
FIG. 3B illustrates a flow chart of yet another example method of generating an integrated circuit layout including one or more uniformly tall areas and/or one or more uniformly short areas, in accordance with some embodiments.

FIG. 3B illustrates a flow chart of an example method 350 of generating an integrated circuit layout including one or more uniformly tall areas and/or one or more uniformly short areas, in accordance with some embodiments of the present disclosure. In some embodiments, the method 350 may be collectively referred to as an EDA. The operations of the method 350 are performed by the respective components illustrated in FIG. 5. For purposes of discussion, the following embodiment of the method 350 will be described in conjunction with FIG. 5. The illustrated embodiment of the method 350 is merely an example. Therefore, it is understood that any of a variety of operations may be omitted, re-sequenced, and/or added while remaining within the scope of the present disclosure.

The method 350 starts with provision operations of "behavioral/functional design 352" and "design constraints 354," in accordance with some embodiments. The behavioral/functional design 352 specifies the desired behavior or function of an integrated circuit (e.g., the integrated circuit 100) based upon various signals or stimuli applied to the inputs of an overall design of the integrated circuit, and may be written in a suitable language, such as a hardware description language (HDL). The behavioral/functional design 352 may be uploaded into the processing unit 510 through the I/O interface 528 (FIG. 5), such as by a user creating the file while the EDA is executing. Alternately, the behavioral/functional design 352 may be uploaded and/or saved on the memory 522 or mass storage device 524, or the behavioral/functional design 352 may be uploaded through the network interface 540 from a remote user (FIG. 5). In these instances, the CPU 520 will access the behavioral/functional design 352 during execution of the EDA. The operation of design constraints 354 is substantially similar to the operation 304 in FIG. 3A, and thus the discussion shall not be repeated here.

The method 350 proceeds to operation 356 of "alternately mixed heights," in accordance with some embodiments. In the operation 356, the system can obtain, retrieve, or otherwise interface with a space consisting of a number of first cell rows that have a tall height (e.g., the height B) and a number of second cell rows that have a short height (e.g., the height A). Each of the first cell rows and the second cell rows completely extends across the space. Such a space may be sometimes referred to as a floorplan with alternately mixed heights.

The method 350 then proceeds to operation 358 of "synthesis," in accordance with some embodiments. In response to obtaining the floorplan with alternately mixed heights (the operation 356), the system can match the behavior and/or functions desired from the behavioral/functional design 352 to (standard) cells from one or more cell libraries, while simultaneously meeting the constraints specified by the design constraints 354 to create a functionally equivalent logic gate-level circuit description, such as an initial netlist.

The method 350 proceeds to operation 360 to "place and route," in accordance with some embodiments. In response to generating the initial netlist, the system can perform the operation 360 to generate an actual physical design for the overall integrated circuit. The operation 360 is configured to form the physical design by taking the chosen cells from cell libraries and placing them into respective cell rows of the floorplan with alternately mixed heights. The placement of each cell within the cell rows, and the placement of each cell row in relation to other cell rows, may be guided by cost functions in order to minimize wiring lengths and area requirements of the resulting integrated circuit. This placement may be done either automatically through the operation 360, or else may alternately be performed partly through a manual process, whereby the user may manually insert one or more cells into a cell row.

In response to generating the actual physical design for the overall integrated circuit on the floorplan of alternately heights (in the operation 360), the system can check, monitor, or otherwise determine whether the design requirements are matched. Various requirements may be checked such as, for example, a timing quality of the actual physical design for the overall integrated circuit, a power quality of the actual physical design for the overall integrated circuit, whether a local congestion issue exists, etc., by performing one or more simulations using circuit simulators, e.g., Simulation Program with Integrated Circuit Emphasis (SPICE).

The method 350 continues to operation 362 to "arrange uniformly tall/short areas," in accordance with some embodiments. The system can identify, from the simulations, one or more areas on the space that include a number of conflicts with a predetermined performance requirement. The conflict may correspond to a violation against at least one of the timing quality requirement, the power quality requirement, etc. The system can recognize, identify, or otherwise determine one or more areas on the space with a number of conflicts satisfying (e.g., exceeding) a predefined threshold. Upon identifying such areas, the system can replace or otherwise update the space (which was expanded by alternately mixed heights) to be expanded by cell rows with different heights but the cell rows are not required to completely extend across the space. In other words, the new cell rows, at least partially constituting the space, can include one or more cell rows with a tall height (e.g., the height B) that partially extend across the space, one or more cell rows with the tall height that completely extend across the space, one or more cell rows with a short height (e.g., the height A) that partially extend across the space, and one or more cell rows with the short height that completely extend across the space. Based on the identified areas that have an exceeding number of violations, the system can arrange one or more uniformly tall or short areas around the same locations of the identified areas. For example, after the simulations, in response to identifying an area on the space that includes a certain number of timing violations, the system can arrange a uniformly tall area (e.g., 104, 106 of FIG. 1A) where only the tall cells can be disposed therein. In this way, the timing violation may be resolved as the cells placed in the uniformly tall area generally have better performance.

In some embodiments, the uniformly tall/short area (or the cells to be placed in this area) shares at least one of a common timing constraint, a common performance constraint, or a common power constraint. For example, the uniformly tall area may be configured to cluster, aggregate, or otherwise integrate cells that are performance-orientated (e.g., subject to a high performance), non-area-orientated (e.g., less subject to a large area), non-power-orientated (e.g., less subject to a high power consumption), and/or timing-critical (e.g., subject to a low latency); and the uniformly short area may be configured to cluster, aggregate, or otherwise integrate cells that are non-performance-orientated (e.g., less subject to a low performance), area-orientated (e.g., subject to a small area), power-orientated (e.g., subject to a low power consumption), and/or non-timing-critical (e.g., less subject to high latency).

The method 350 then proceeds to operation 364 of "synthesis," in accordance with some embodiments. In response to arranging the uniformly short/tall areas (the operation 362), the system can again match the behavior and/or functions desired from the behavioral/functional design 352 to (standard) cells from one or more cell libraries, while simultaneously meeting the constraints specified by the design constraints 354 to create a functionally equivalent logic gate-level circuit description, such as a second netlist (operation 366). In the operation 364, the system can form the second netlist by arranging a uniformly tall or short area for each of the identified areas that has the exceeding number of violations. Concurrently with arranging the uniformly tall/short areas, the system can arrange one or more areas constituted by a mix of the tall cell rows and the short cell rows. The operation 364 may sometimes be referred to as a "physically aware" synthesis.

In some embodiments, concurrently with generating the netlist, the system can optionally generate a reference floorplan (operation 368). The reference floorplan may include a number of areas that each has been arranged as a uniformly tall area, a uniformly short area, or an area with mixed heights. Each of the areas may include corresponding cells placed therein. Such a reference floorplan may function as an initial value or guess for the subsequent operation (e.g., operation 370), which may advantageously reduce calculation (e.g., converge) time.

The remaining operations of the method 350 are substantially similar as the operations discussed with respect to FIG. 3A. For example, operations 370, 372, 374, and 376 are substantially similar to the operations 312, 314, 316, and 318, respectively. Thus, the discussions of such operations shall not repeated here.

In some embodiments, during the synthesis (e.g., the operations 258, 358, 364, etc.), the system, as disclosed herein, can allow or otherwise control the density of a first type of cells to be placed in a given area up to a predefined upper limit. Upon determining that the density of the first type of cells satisfies the predefined upper limit, the system can then allow or otherwise control the density of a second type of cells to be placed in the given area down to a predefined lower limit. The area can correspond to a certain circuit module of an integrated circuit. The area can correspond to a certain physical area on a given space, or floorplan, arranged for an integrated circuit layout. For example, the system can divide the given space into a plurality of evenly sized windows that each corresponds to the area. During synthesis, the system can allow up to a certain density of cells to be placed within each window. In this way, while synthesizing a netlist, for example, for an integrated circuit layout, the system can strike a balance in terms of controlling Power Performance Area (PPA) of the integrated circuit layout. For example, without setting the upper limit during the synthesis, the cell density in one or more of the areas may reach 100%, which may result in additional steps in a subsequent operation (e.g., while placing and routing the netlist as a physical design).

Figure 4:
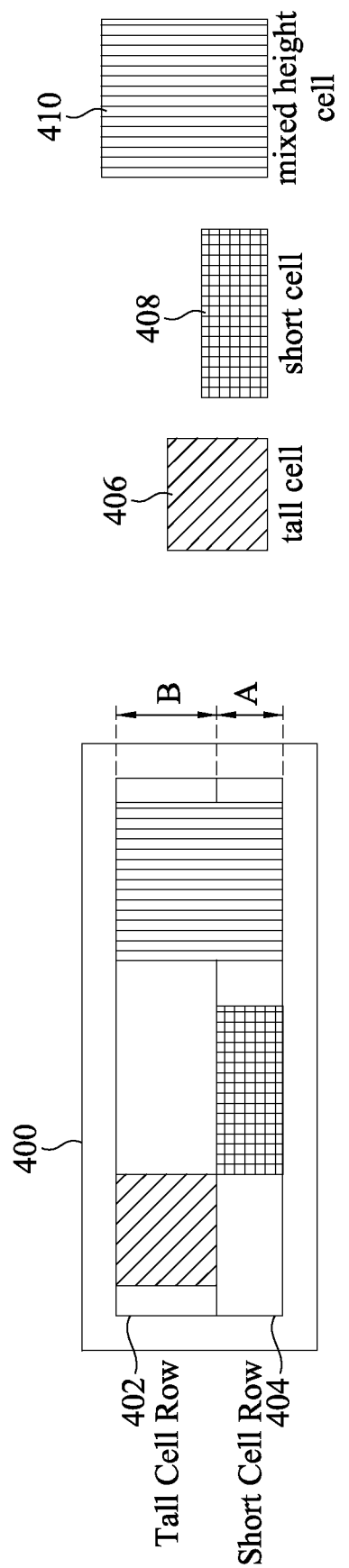
FIG. 4 illustrates a schematic diagram of a portion of a netlist that includes a tall cell row and a short cell row, in accordance with some embodiments.

The system can define a density of the tall cells as (Tall Cell Area+B/(A+B)×Mixed Height Cell Area)/Tall Cell Row Area; and a density of the short cells as (Short Cell Area+ A/(A+B)×Mixed Height Cell Area)/Short Cell Row Area, which may be better illustrated in FIG. 4. As shown in FIG. 4, a portion of a netlist (during synthesis) 400, which can be one of the above-described windows, includes a cell row 402 having the height B (i.e., the tall cell row) and a cell row 404 having the height A (i.e., the short cell row) disposed next to each other. The system may place a tall cell 406 along the cell row 402, a short cell 408 along the cell row 404, and a mixed height cell 410 along both of the cell rows 402 and 404. In some embodiments, such a mixed height cell may be referred to as a cell having a mix of heights. In the current example of FIG. 4, the cells has a mix of one of the height A and one of the height B (i.e., 1×A+1×B). It is understood that a mixed height cell can have any combination of the heights A and B (e.g., 1×A+2×B, 2×A+1×B, A+3×B, etc.) while remaining within the scope of the present disclosure. Referring again to the definitions of the densities using FIG. 4, "Tall Cell Area" may be referred to as the area occupied by one or more tall cells (e.g., 406); "Mixed Height Cell Area" may be referred to as the area occupied by one or more mixed height cells (e.g., 410); "Tall Cell Row Area" may be referred to as the total area expanded by one or more tall cell rows; "Short Cell Area" may be referred to as the area occupied by one or more short cells (e.g., 408); and "Short Cell Row Area" may be referred to as the total area expanded by one or more short cell rows.

Referring now to FIG. 5, a block diagram of an information handling system (IHS) 500 is provided, in accordance with some embodiments of the present invention. The IHS 500 may be a computer platform used to implement any or all of the processes discussed herein to design an integrated circuit. The HIS 500 may comprise a processing unit 510, such as a desktop computer, a workstation, a laptop computer, or a dedicated unit customized for a particular application. The HIS 500 may be equipped with a display 514 and one or more input/output (I/O) components 512, such as a mouse, a keyboard, or printer. The processing unit 510 may include a central processing unit (CPU) 520, memory 522, a mass storage device 524, a video adapter 526, and an I/O interface 528 connected to a bus 530.

The bus 530 may be one or more of any type of several bus architectures including a memory bus or memory controller, a peripheral bus, or video bus. The CPU 520 may comprise any type of electronic data processor, and the memory 522 may comprise any type of system memory, such as static random access memory (SRAM), dynamic random access memory (DRAM), or read-only memory (ROM).

The mass storage device 524 may comprise any type of storage device configured to store data, programs, and other information and to make the data, programs, and other information accessible via the bus 530. The mass storage device 524 may comprise, for example, one or more of a hard disk drive, a magnetic disk drive, an optical disk drive, or the like.

The video adapter 526 and the I/O interface 528 provide interfaces to couple external input and output devices to the processing unit 510. As illustrated in FIG. 5, examples of input and output devices include the display 514 coupled to the video adapter 526 and the I/O components 512, such as a mouse, keyboard, printer, and the like, coupled to the I/O interface 528. Other devices may be coupled to the processing unit 510, and additional or fewer interface cards may be utilized. For example, a serial interface card (not shown) may be used to provide a serial interface for a printer. The processing unit 510 also may include a network interface 540 that may be a wired link to a local area network (LAN) or a wide area network (WAN) 516 and/or a wireless link.

It should be noted that the HIS 500 may include other components/devices. For example, the HIS 500 may include power supplies, cables, a motherboard, removable storage media, cases, and the like. These other components/devices, although not shown, are considered part of the HIS 500.

In some embodiments of the present invention, an Electronic Design Automation (EDA) is program code that is executed by the CPU 520 to analyze a user file to obtain the layout of an integrated circuit (e.g., the integrated circuit 100 discussed above). Further, during the execution of the EDA, the EDA may analyze functional components of the layout, as is known in the art. The program code may be accessed by the CPU 520 via the bus 530 from the memory 522, mass storage device 524, or the like, or remotely through the network interface 540.

In one aspect of the present disclosure, an integrated circuit layout is provided. The integrated circuit layout includes one or more first cell rows partially extending across a space arranged for an integrated circuit layout along a first direction. Each of the one or more first cell rows has a first height along a second direction perpendicular to the first direction. The integrated circuit layout includes one or more third cell rows partially extending across the space along the first direction. Each of the one or more third cell rows has a second height along the second direction, the second height different from the first height.

In another aspect of the present disclosure, a method of generating an integrated circuit layout is disclosed. The method includes receiving a design of an integrated circuit. The method includes identifying, from the design of the integrated circuit, a first circuit module of the integrated circuit based on either a user specification or a first common characteristic. The method includes identifying, from the design of the integrated circuit, a second circuit module of the integrated circuit based on either the user specification or a second common characteristic. The method includes arranging, based on the identified first circuit module and the identified second circuit module, a first contiguous area and a second contiguous area relative to a space arranged for the design of the integrated circuit. The first area consists of one or more first cell rows, extending either completely or partially across the space along a first direction that has a first height along a second direction perpendicular to the first direction. The second area consists of one or more second cell rows, extending either completely or partially across the space along the first direction that has a second, different height along the second direction.

In yet another aspect of the present disclosure, a computer program product includes a computer-readable program medium code stored thereupon. The code, when executed by a processor, causes the processor to implement a method. The method includes receiving a design of an integrated circuit. The method includes identifying a space arranged for the design of the integrated circuit. The space consists of a plurality of first cell rows, completely extends across the space along a first direction that has a first height along a second direction perpendicular to the first direction and a plurality of second cell rows, completely extends across the space along the first direction that has a second, different height along the second direction. The method includes placing, based on the design, a plurality of circuit modules of the integrated circuit on the space. The method includes estimating, based on the placements of the plurality of circuit modules, performance of the integrated circuit. The method includes arranging, based on the estimated performance, at least one of a first contiguous area or a second contiguous area on the space. The first area consists of one or more third cell rows, extending either completely or partially across the space along the first direction that has the first height. The second area consists of one or more fourth cell rows, extending either completely or partially across the space along the first direction that has the second, different height.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated circuit layout, comprising:
a space arranged for an integrated circuit layout; and
wherein the space comprises:
a first area consisting of a plurality of first cell rows partially extending across the space along a first direction, each of the first cell rows having a first height along a second direction perpendicular to the first direction; and
a second area consisting of a plurality of second cell rows partially extending across the space along the first direction, each of the one or more second cell rows having a second height along the second direction, the second height different from the first height,
wherein each of the first cell rows has a pair of first power rails extending along its edges, respectively, and each of the second cell rows has a pair of second power rails extending along its edges, respectively.

2. The integrated circuit layout of claim 1, further comprising:
a plurality of first standard cells disposed in each of the first cell rows, each of the first standard cells having the first height; and
a plurality of second standard cells disposed in each of the second cell rows, each of the second standard cells having the second height.

3. The integrated circuit layout of claim 2, wherein the first standard cells correspond to a first circuit module, and the second standard cells correspond to a second circuit module.

4. The integrated circuit layout of claim 2, wherein the first standard cells share at least one of a first timing constraint, a first performance constraint, or a first power constraint, and the second standard cells share at least one of a second timing constraint, a second performance constraint, or a second power constraint.

5. The integrated circuit layout of claim 1, wherein the space comprises a third area consisting of:
a plurality of third cell rows partially extending across the space along the first direction, each of the third cell rows having the first height along the second direction; and
a plurality of fourth cell rows partially extending across the space along the first direction, each of the fourth cell rows having the second height along the second direction.

6. The integrated circuit layout of claim 5, wherein the third cell rows and the fourth cell rows are alternately arranged along the second direction.

7. The integrated circuit layout of claim 5, wherein the third area is interposed between the first area and the second area along the first direction.

8. The integrated circuit layout of claim 1, wherein the space comprises a third area consisting of:
- a plurality of third cell rows completely extending across the space along the first direction, each of the one or more third cell rows having the first height along the second direction.

9. The integrated circuit layout of claim 8, wherein the space comprises a fourth area consisting of:
- a plurality of fourth cell rows completely extending across the space along the first direction, each of the one or more fourth cell rows having the second height along the second direction.

10. An integrated circuit layout, comprising:
a space arranged for an integrated circuit layout; and
wherein the space comprises:
- a first area consisting of a plurality of first cell rows partially extending across the space along a first direction, each of the first cell rows having a first height along a second direction perpendicular to the first direction;
- a second area consisting of a plurality of second cell rows partially extending across the space along the first direction, each of the one or more second cell rows having a second height along the second direction;
- a third area comprising a plurality of third cell rows completely extending across the space along the first direction, each of the one or more third cell rows having the first height along the second direction; and
- a fourth area comprising a plurality of fourth cell rows completely extending across the space along the first direction, each of the one or more fourth cell rows having the second height along the second direction;
wherein the second height is different from the first height,
wherein each of the first cell rows has a pair of first power rails extending along its edges, respectively, each of the second cell rows has a pair of second power rails extending along its edges, respectively, each of the third cell rows has a pair of third power rails extending along its edges, respectively, each of the fourth cell rows has a pair of fourth power rails extending along its edges, respectively.

11. The integrated circuit layout of claim 10, further comprising:
- a plurality of first standard cells disposed in each of the first or third cell rows, each of the first standard cells having the first height; and
- a plurality of second standard cells disposed in each of the second or fourth cell rows, each of the second standard cells having the second height.

12. The integrated circuit layout of claim 10, wherein the space comprises a fifth area consisting of:
- a plurality of fifth cell rows partially extending across the space along the first direction, each of the fifth cell rows having the first height along the second direction; and
- a plurality of sixth cell rows partially extending across the space along the first direction, each of the sixth cell rows having the second height along the second direction.

13. The integrated circuit layout of claim 12, wherein the fifth cell rows and the sixth cell rows are alternately arranged along the second direction.

14. The integrated circuit layout of claim 12, wherein the fifth area is interposed between the first area and the second area along the first direction.

15. The integrated circuit layout of claim 12, wherein the fifth area is disposed next to the third or fourth area along the second direction.

16. An integrated circuit layout, comprising:
a space arranged for an integrated circuit layout; and
wherein the space comprises:
- a first area consisting of a plurality of first cell rows partially extending across the space along a first direction, each of the first cell rows having a first height along a second direction perpendicular to the first direction and configured to place a plurality of first standard cells having the first height; and
- a second area consisting of a plurality of second cell rows partially extending across the space along the first direction, each of the one or more second cell rows having a second height along the second direction and configured to place a plurality of second standard cells having the second height;
wherein the second height is different from the first height,
wherein the first standard cells correspond to a first circuit module, and the second standard cells correspond to a second circuit module.

17. The integrated circuit layout of claim 16, wherein the first standard cells share at least one of a first timing constraint, a first performance constraint, or a first power constraint, and the second standard cells share at least one of a second timing constraint, a second performance constraint, or a second power constraint.

18. The integrated circuit layout of claim 16, wherein each of the first cell rows has a pair of first power rails extending along its edges, respectively, and each of the second cell rows has a pair of second power rails extending along its edges, respectively.

19. The integrated circuit layout of claim 16, wherein the space comprises a third area consisting of:
- a plurality of third cell rows partially extending across the space along the first direction, each of the third cell rows having the first height along the second direction; and
- a plurality of fourth cell rows partially extending across the space along the first direction, each of the fourth cell rows having the second height along the second direction.

20. The integrated circuit layout of claim 19, wherein the third cell rows and the fourth cell rows are alternately arranged along the second direction.

* * * * *